United States Patent
James

(10) Patent No.: US 9,273,716 B2
(45) Date of Patent: *Mar. 1, 2016

(54) SELF-INDEXING NUT PLATE

(71) Applicant: The Boeing Company, Chicago, IL (US)

(72) Inventor: Lowell Scott James, Marysville, WA (US)

(73) Assignee: The Boeing Company, Chicago, IL (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/515,611

(22) Filed: Oct. 16, 2014

(65) Prior Publication Data

US 2015/0037115 A1 Feb. 5, 2015

Related U.S. Application Data

(62) Division of application No. 13/357,275, filed on Jan. 24, 2012, now Pat. No. 8,911,191.

(51) Int. Cl.
| | |
|---|---|
| F16B 37/04 | (2006.01) |
| F16B 39/24 | (2006.01) |
| B64C 1/06 | (2006.01) |
| F16L 3/123 | (2006.01) |
| F16M 11/04 | (2006.01) |
| B64C 1/00 | (2006.01) |
| F16B 39/28 | (2006.01) |
| H02G 3/00 | (2006.01) |

(52) U.S. Cl.
CPC . *F16B 39/24* (2013.01); *B64C 1/00* (2013.01); *B64C 1/06* (2013.01); *F16B 37/041* (2013.01); *F16B 39/28* (2013.01); *F16L 3/123* (2013.01); *F16M 11/041* (2013.01); *F16B 37/043* (2013.01); *F16B 37/045* (2013.01); *H02G 3/263* (2013.01)

(58) Field of Classification Search
CPC .............................. F16B 37/043; F16B 37/045
USPC ..................... 411/172, 174, 84, 85, 956, 970; 248/220.31–220.43, 221.11, 221.12, 248/222.13
See application file for complete search history.

(56) References Cited

U.S. PATENT DOCUMENTS

| | | |
|---|---|---|
| 2,168,721 A | 8/1939 | Tinnerman |
| 2,250,072 A | 7/1941 | Tinnerman |
| 2,286,696 A | 6/1942 | Tinnerman |
| 2,379,893 A | 7/1945 | Herman |
| 2,387,951 A * | 10/1945 | Slater et al. .................. 248/68.1 |

(Continued)

FOREIGN PATENT DOCUMENTS

EP 1122477 A2 8/2001

*Primary Examiner* — Flemming Saether
(74) *Attorney, Agent, or Firm* — Smith Moore Leatherwood LLP; Thomas W. Epting; Matthew S. Bedsole

(57) ABSTRACT

An aircraft comprises a plurality of spanner bars. Each spanner bar has a pattern of mounting holes separated by lands. A plurality of nut plates engage the spanner bars. Each nut plate includes a body having a mounting surface against one of the spanner bars; and first and second posts extending from the mounting surface and through respective holes in the corresponding spanner bar. Each post has an undercut portion that abuts against one of the lands. Each nut plate further includes a locking member occupying a space between one of the posts and the lands to prevent the nut plate from disengaging the corresponding spanner bar.

7 Claims, 9 Drawing Sheets

(56) References Cited

U.S. PATENT DOCUMENTS

| | | | |
|---|---|---|---|
| 2,657,443 A | 11/1953 | Hartman | |
| 3,601,432 A | 8/1971 | Fenwick et al. | |
| 4,303,217 A | 12/1981 | Garfinkle | |
| 4,341,486 A | 7/1982 | Hammerschlag | |
| 4,506,856 A * | 3/1985 | Rich et al. | 248/220.31 |
| 4,619,428 A | 10/1986 | Bailey | |
| 4,819,324 A | 4/1989 | Roberts | |
| 5,020,952 A | 6/1991 | Zeigler et al. | |
| 5,118,234 A | 6/1992 | Norkus | |
| 6,209,827 B1 | 4/2001 | Kawai | |
| 6,880,787 B2 * | 4/2005 | Stephen et al. | 248/68.1 |
| 8,002,507 B2 * | 8/2011 | James | 411/85 |
| 2004/0013495 A1 | 1/2004 | Hassed | |

* cited by examiner

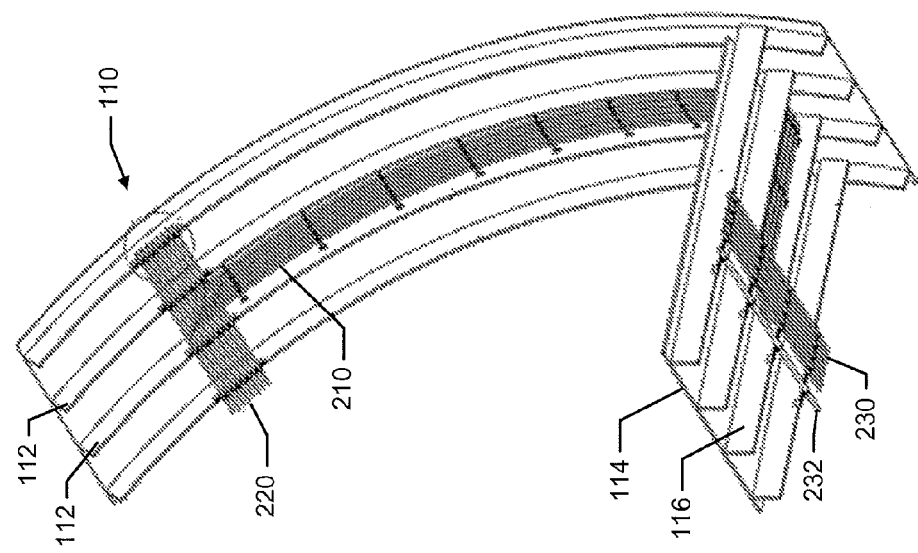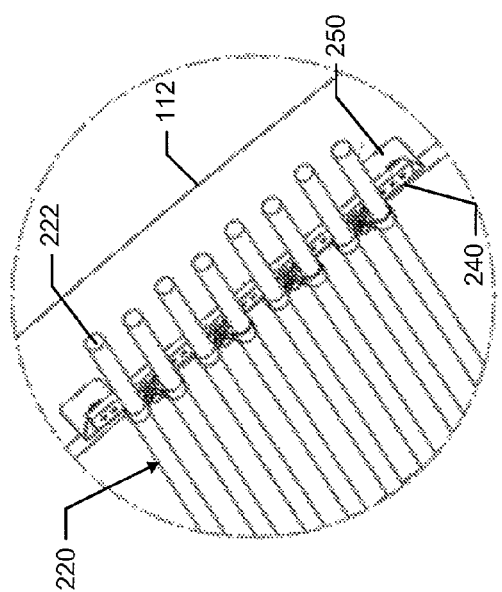

FIG. 6A
FIG. 6B
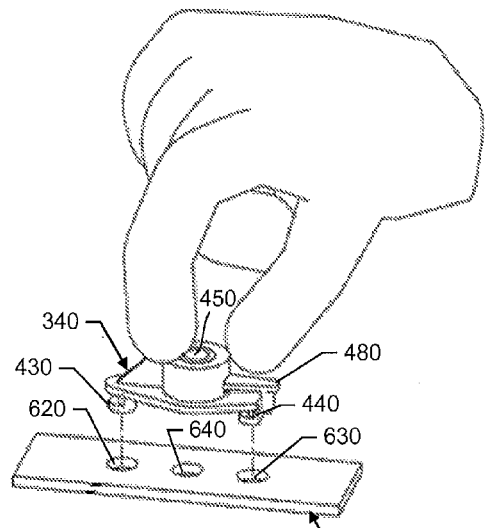
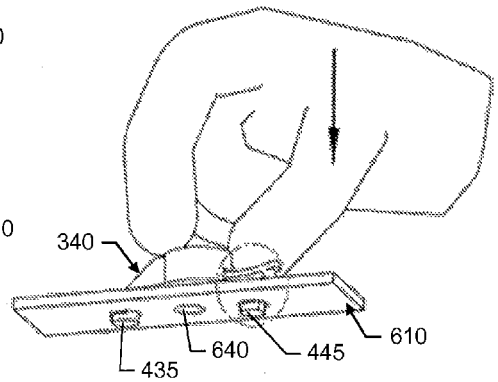
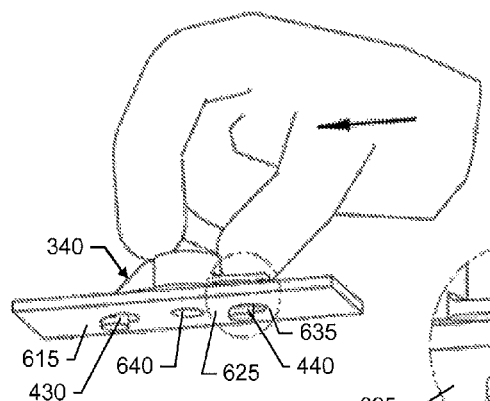
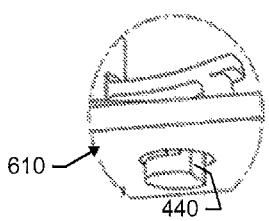
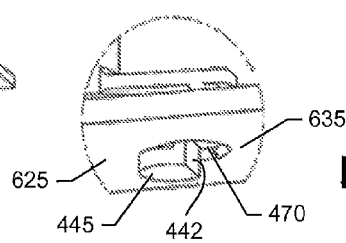
FIG. 6D
FIG. 6C
FIG. 6E

SELF-INDEXING NUT PLATE

This application is a divisional application and claims benefit of U.S. nonprovisional application Ser. No. 13/357,275, filed Jan. 24, 2012, and the entirety of the foregoing nonprovisional application is incorporated herein by reference.

BACKGROUND

Spanner bars and other secondary support structures are commonly used in commercial aircraft for wire bundle management. The spanner bars may be secured to system support brackets, which are attached to primary aircraft structure. Wire support hardware such as p-clamps and ring posts are fastened to the spanner bars. Wire bundles are secured to the wire support hardware.

Wire support hardware may be attached to a spanner bar as follows. The wire support hardware is positioned on a front side of the spanner bar. The threaded portion of a fastener is aligned with a select open hole of the spanner bar and an open hole of the wire support hardware. The fastener is maneuvered through the holes until the threaded portion is exposed on a back side of the spanner bar. A loose washer and nut are placed over the threaded portion, and the nut is tightened with a hand tool until firmly clamped against the spanner bar. This process is repeated for each fastener.

Often, there is no visual sightline to the back side of the spanner bar. Therefore, the nut and washer are installed blindly. Some manual dexterity is needed to install the nut and washer blindly without dropping either part.

It would be desirable to reduce part count and installation time of attaching wire support hardware to a spanner bar. Even a seemingly trivial reduction for a single nut and washer can be significant due to the large number of fastening operations on secondary support structures in a commercial aircraft.

SUMMARY

According to an embodiment herein, an aircraft comprises a plurality of spanner bars. Each spanner bar has a pattern of mounting holes separated by lands. A plurality of nut plates engage the spanner bars. Each nut plate includes a body having a mounting surface against one of the spanner bars; and first and second posts extending from the mounting surface and through respective holes in the corresponding spanner bar. Each post has an undercut portion that abuts against one of the lands. Each nut plate further includes a locking member occupying a space between one of the posts and the lands to prevent the nut plate from disengaging the corresponding spanner bar.

According to another embodiment herein, an apparatus comprises a member having a surface with an alternating pattern of a first land, a first hole, a second land, a second hole, and a third land. The apparatus further comprises at least one nut plate engaging the member. The nut plate includes a body having a mounting surface, and first and second mounting posts extending from the mounting surface. Each post has an undercut portion. The first and second posts extend into the first and second holes with their undercut portions filled with the first and second lands. The nut plate further includes a locking member occupying a space between the second post and the third land to prevent the nut plate from disengaging the member.

According to another embodiment herein, a nut plate is configured to engage a thin gauge member having a pattern of equidistant holes and lands there between. The nut plate comprises a body having a mounting surface and a bore that extends from the mounting surface in a first direction. The bore has an internally threaded portion. The nut plate further comprises first and second posts extending from the mounting surface in a second direction opposite the first direction. Each post has a solid elliptical cross section and terminates in an enlarged cap. The posts are located on opposite sides of the bore. The bore is offset from the posts so it is aligned with an opening in the member when the nut plate engages the member.

These features and functions may be achieved independently in various embodiments or may be combined in other embodiments. Further details of the embodiments can be seen with reference to the following description and drawings.

BRIEF DESCRIPTION OF THE DRAWINGS

FIGS. 2A and 2B are illustrations of raceway wire bundles in a fuselage of an aircraft.

FIGS. 6A-6E are illustrations of a self-indexing nut plate during various stages of installation.

DETAILED DESCRIPTION

Figure 1:
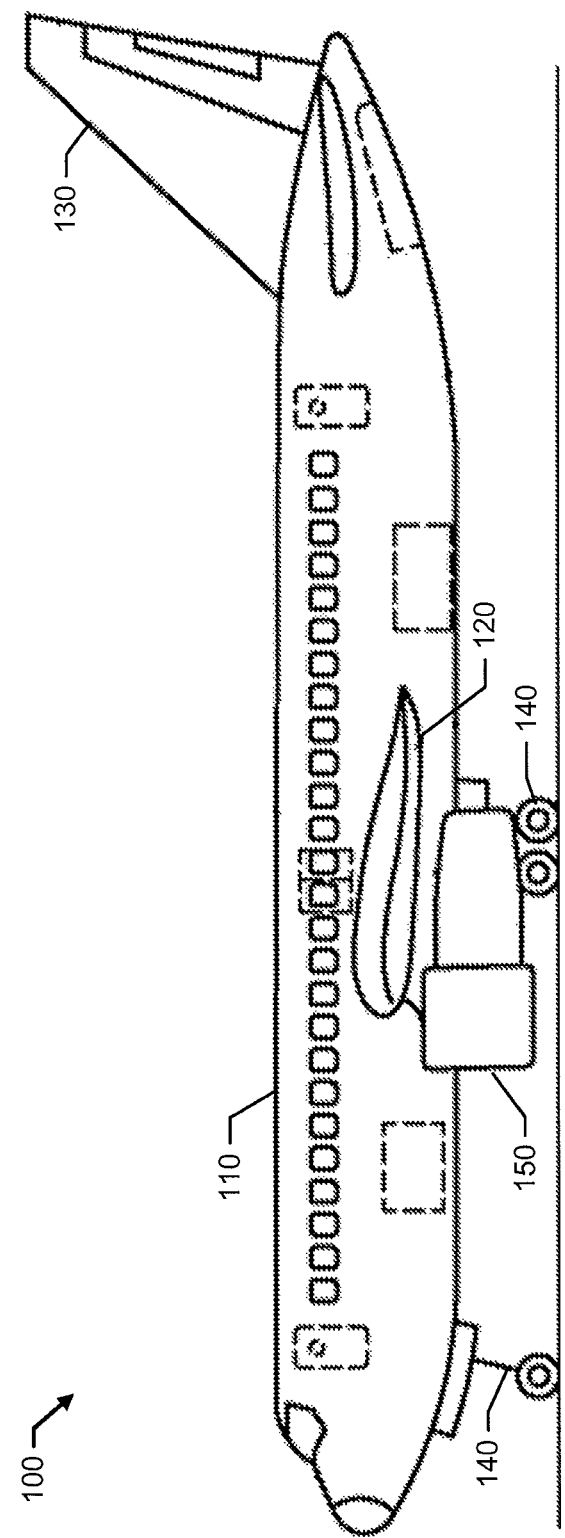
FIG. 1 is an illustration of an aircraft.

Reference is made to FIG. 1, which illustrates an aircraft 100. The aircraft 100 includes a fuselage 110, wing assemblies 120, empennage 130, and landing gear assemblies 140. Propulsion engines 150 are mounted to the wing assemblies 120.

The aircraft 100 further includes wiring assemblies and tubing assemblies. The wiring assemblies include wire bundles that are attached to secondary support structures such as spanner bars. The tubing assemblies include tubing that is attached to secondary support structures such as combination tube and spanner bars. These spanner bars may be located inside the fuselage 110 and wing assemblies 120.

Reference is now made to FIG. 2A, which illustrates some raceway wire bundles 210, 220 and 230 inside the aircraft fuselage 110. A frame bay raceway wire bundle 210 is located between frames 112 of the fuselage 110. A crown raceway wire bundle 220 extends across frames 112 of the fuselage 110. A floor raceway wire bundle 230 is located beneath a floor 114 of the fuselage 110, and extends across several floor beams 116. The floor raceway wire bundle 230 also supports a small tube 232.

Additional reference is made to FIG. 2B, which shows a portion of the crown raceway wire bundle 220 in greater detail. Wires 222 in the bundle are clamped to a spanner bar 240. The spanner bar 240, in turn, is secured to a frame 112 by a bracket 250.

Figure 3:
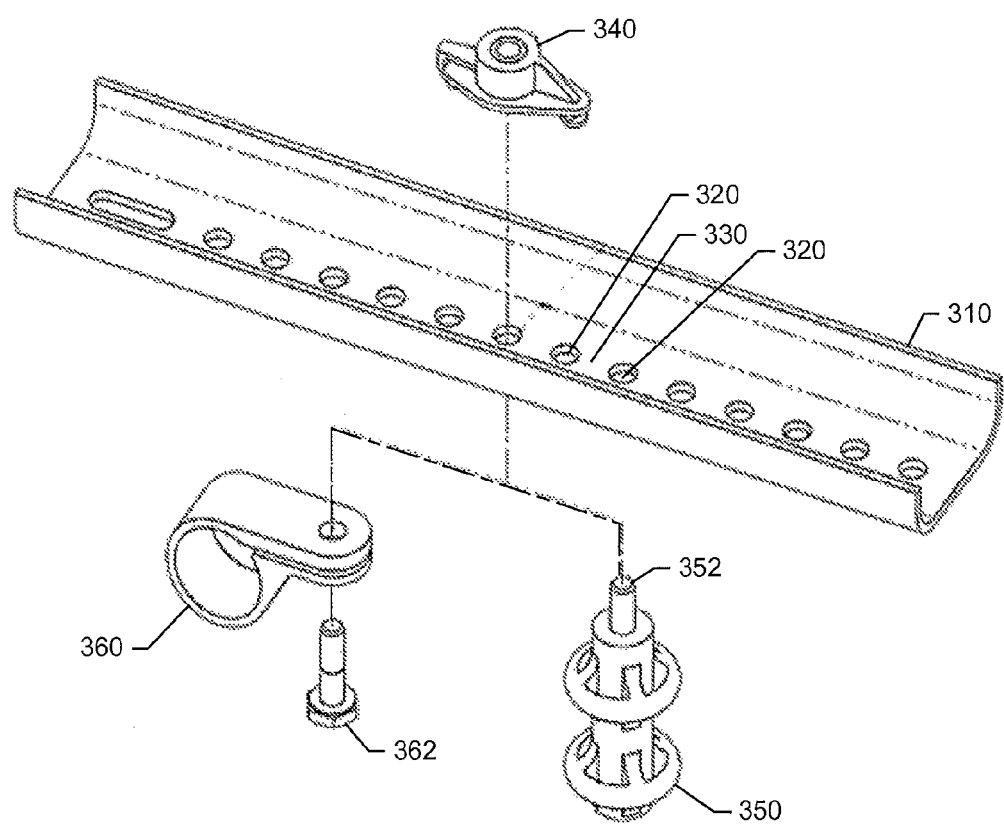
FIG. 3 is an illustration of a spanner bar and a self-indexing snap-on nut plate that engages the spanner bar.

Reference is made to FIG. 3, which illustrates a spanner bar 310. The spanner bar 310 is a thin gauge member having a repeating pattern of mounting holes 320 separated by lands 330. For instance, the spanner bar 310 may have an equally spaced, predrilled open-hole pattern.

FIG. 3 also illustrates an embodiment of a self-indexing nut plate 340. The nut plate 340 is engaged with the spanner bar 310 and locked in place, whereby an internally threaded bore in the nut plate 340 is aligned with one of the holes in the spanner bar 310. The nut plate 340 is engaged with the spanner bar prior to being engaged with fastener hardware such as a ring post 350 or p-clamp 360 (which holds a wire bundle or tubing). Thereafter, a threaded stud 352 of the ring post 350 or a p-clamp bolt 362 may be inserted through the hole of the spanner bar 310 and threaded into the bore of the nut plate 340. A wire bundle (not shown) may be attached to the ring post 350 after the ring post 350 has been threaded into the nut plate 340. A wire bundle or tubing may be held by the p-clamp 360 as the p-clamp bolt 362 is being threaded into the nut plate 340.

Figure 4A:
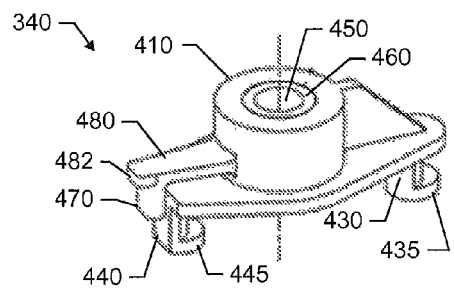
FIGS. 4A to 4D are illustrations of a self-indexing nut plate.
Figure 4B:
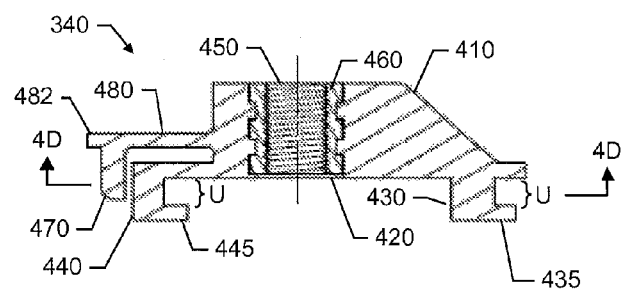

Reference is made to FIGS. 4A and 4B, which illustrate the embodiment of the self-indexing nut plate 340 in greater detail. The nut plate 340 includes a body 410 having a flat mounting surface 420 affixed thereto and an internal bore 450 that extends to the mounting surface 420. The bore 450 has an internally threaded portion 460 for engaging fastener hardware (e.g., the ring post 350). In some embodiments, the threaded portion 460 may be a full thread metallic insert 460.

The nut plate 340 further includes first and second mounting posts 430 and 440 extending from the mounting surface 420. The mounting posts 430 and 440 may be orthogonal to the mounting surface 420. Each mounting post 430 and 440 has an undercut portion U. In some embodiments, each post 430 and 440 terminates in a circular cap 435 and 445, which have larger cross-sections than the posts 430 and 440. In those embodiments, each undercut portion U is defined by a cap 435 or 445, post 430 or 440, and mounting surface 420.

The posts 430 and 440 are located on opposite sides of the bore 450. The bore 450 is offset from the posts 430 and 440 (that is, the bore 450 is closer to one of the posts 440 than the other post 430) by an offset distance. The offset distance is such that the bore 450 is aligned with a hole in the spanner bar 310 when the undercut portions U of the posts 430 and 440 engage the lands of the spanner bar 310 (that is, when the nut plate 340 engages the spanner bar 310).

The nut plate 340 further includes a spring lever 480 having a locking member 470 that is hinged from the body 410 by the spring lever 480. Spring lever 480 is separated by a gap from mounting post 440 and has a first end cantilevered from the body 410 and a second, free end. Locking member 470 can extend generally downwardly from the free end to result in spring lever 480 having a generally L-shape. The lever 480 can move the locking member 470 through the gap between a locked position and an unlocked position. The locking member 470 may be retracted by pulling up on a release grip ledge 482 of the spring lever 480 located adjacent to and extending transversely with respect to the locking member 470. This retraction feature is desirable because it allows a mislocated nut plate 340 to be relocated, and it allows nut plates to be removed and reused.

In some embodiments, the body 410, the posts 430 and 440, the caps 435 and 445, the locking member 470 and the spring lever 480 are made of plastic. The body 410 may include a boss molded around the full thread metallic insert 460.

Figure 4C:
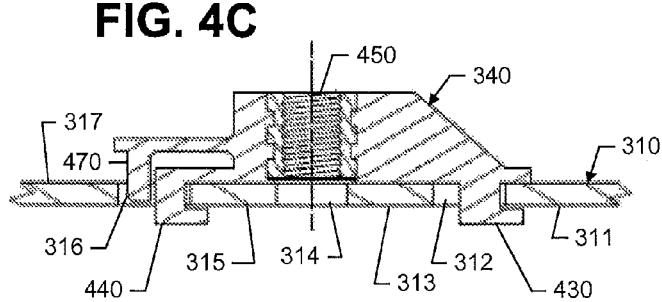

Reference is now made to FIG. 4C, which illustrates the nut plate 340 locked to the spanner bar 310. FIG. 4C shows the following features of the spanner bar 310: a first land 311, first hole 312, second land 313, second hole 314, third land 315, third hole 316, and fourth land 317.

The nut plate 340 engages the spanner bar 310 when the posts 430 and 440 are abutted against the first and third lands 311 and 315 of the spanner bar 310. The nut plate 340 is locked to the spanner bar 310 when the locking member 470 is inserted into the third hole 316 and occupies the space between the post 440 and the fourth land 317. When the nut plate 340 is locked as such, the bore 450 of the nut plate 340 is aligned with the second hole 314 in the spanner bar 310.

Figure 4D:
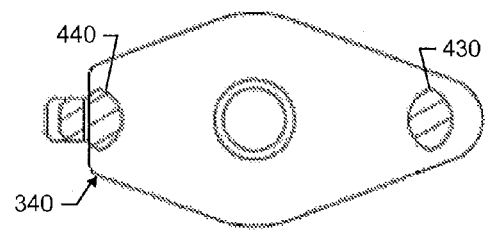

Reference is now made to FIG. 4D, which is a cross-sectional view of FIG. 4B along lines 4D-4D. In some embodiments, the posts 430 and 440 may have an elliptical shape in cross section. Moreover, the posts 430 and 440 are preferably solid. This geometry allows the posts 430 and 440 to withstand shear forces that are generated when a fastener (e.g., a ring post stud 352) is torqued onto the nut plate 340.

The posts 430 and 440 are superior to conventional pin barbs. The posts 430 and 440 have greater cross-sectional area than conventional pin barbs and are better suited to handle greater torque loads (which can result when a fastener is threaded into the nut plate 340). The posts 430 and 440 also have greater ledge surface area and can counter larger axial loads. Therefore, the posts 430 and 440 are less likely to disengage and release the nut plate 340 from the spanner bar 310. Pin barbs, in contrast, tend to collapse inward and disengage.

Reference is now made to FIG. 5 and FIGS. 6A-6E, which illustrate a method of installing a nut plate 340 onto a secondary support structure 610. Three holes of the support structure 610 will be used by the nut plate 340.

Figure 5:
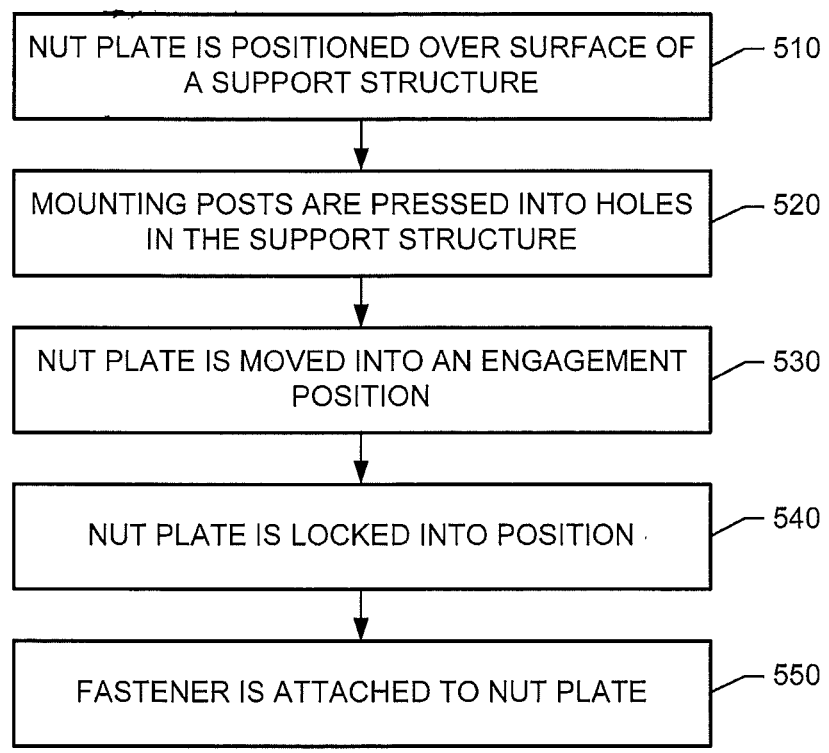
FIG. 5 is an illustration of a method of installing a self-indexing nut plate on a support member and using the nut plate.

Referring to block 510 of FIG. 5 and FIG. 6A, the nut plate 340 is held in one hand and positioned above the surface of the support structure 610. The posts 430 and 440 of the nut plate 340 are aligned with first and second holes 620 and 630 of the support structure 610.

Referring to block 520 of FIG. 5 and FIG. 6B, the first and second mounting posts 430 and 440 are firmly pressed (in the direction of the arrow) through the first and second holes 620 and 630 until the mounting surface of the nut plate 340 makes contact with the support structure 610. At this point, the center axis of the internal bore 450 is not in alignment with a center (third) hole 640. In addition, the spring lever 480 is flexed upward. The undercut portions of the mounting posts 430 and 440 have not yet engaged the support structure 610 (see also FIG. 6C).

Referring to block 530 of FIG. 5 and FIG. 6D, the nut plate 340 is slid forward in the direction of the arrow until each mounting post 430 and 440 abuts against a land 615 and 625. At this point, the bore 450 in the nut plate 340 is aligned with the center hole 640. Thus, the nut plate 340 is self-indexing.

The undercut portions (U of FIG. 4B) in the mounting posts 430 and 440 may be slightly wider than the gauge of the support structure 610 of FIG. 6B. In some embodiment, the gap may be slightly narrower, whereby the cap 445 is deflected outward by the land 625 and snap onto the land 625 as the nut plate 340 is being pushed into engagement (FIG. 6E). An audible sound such as a "click" may occur as the locking member 470 is snapped onto the open area of the hole. The audible sound provides additional input to the installer that the nut plate 340 has properly engaged the support member 610.

At block 540 of FIG. 5, the nut plate 340 is locked in position. The spring lever 480 is depressed to push the locking member 470 into the space between the second mounting post 430 and the trailing land 635. A trailing surface 442 of the second mounting post 440 may be flattened to mate with the locking member 470 (FIG. 6E). The locking member 470 prevents the nut plate 340 from moving along the support structure 610. The caps 435 and 445 prevent the engaged nut plate 340 from being pulled away from the support structure 610.

At block 550 of FIG. 5, a fastener is installed into the nut plate 340. This may be done immediately after the nut plate in installed, or some time later.

A nut plate herein offers several advantages over a conventional nut and washer. A nut plate herein may be installed without having to also install fastener hardware such as a ring post. The independent installation reduces production flow and allows modularization. As but one example, a plurality of nut plates herein are pre-installed on a spanner bar to form a raceway wire bundle module. Preassembling raceway wire bundles into modules reduces the touch time of the installers during the installation of the wire bundles in an aircraft. Installing a wire bundle module is more efficient than installing individual wires.

A nut plate herein is self-indexing. When the nut plate engages a support member, its bore is aligned with a hole in the support structure. Time and ease of installation is reduced.

Moreover, no tooling is required to install a nut plate. No manual dexterity is needed to slip a washer over a fastener, and then turn a nut onto the fastener. A nut plate herein is simply pushed into a secondary support structure, snapped into position, and locked in place.

A nut plate herein has a lower part count than a conventional nut and washer. In addition to terminating a fastener, the nut plate functions as a washer.

The savings in time and cost afforded by a single nut plate herein might seem trivial. However, given the total number of fastening operations in a commercial aircraft, the savings in the aggregate can be quite substantial.

A nut plate herein is not limited to aircraft. Other applications include, but are not limited to, marine, automotive and other electronic products.

A nut plate herein is not limited to spanner bars and similar support structures. For example, a nut plate herein may be used to mount a sidewall gap cover to sidewall panels.

Figure 7A:
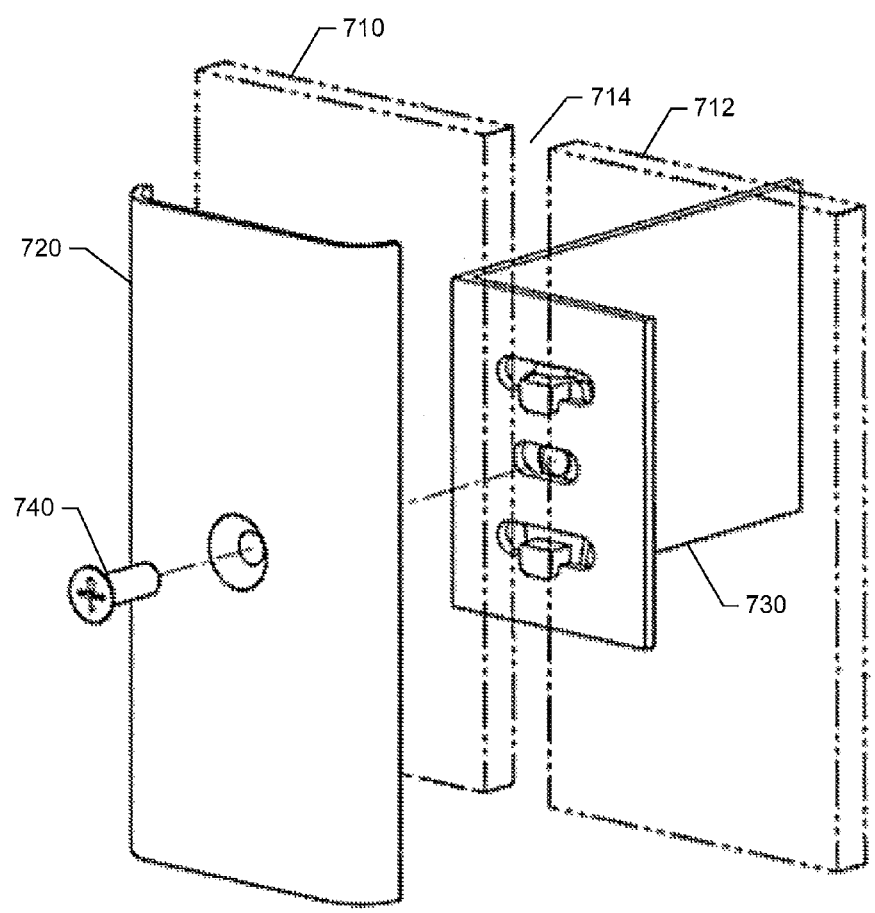
FIG. 7A is an illustration of an assembly including two sidewalls, a sidewall gap cover, a self-indexing nut plate, and a bracket having a slotted hole pattern for mounting the sidewall gap cover.

Reference is now made to FIG. 7A, which illustrates two adjacent sidewall panels 710 and 712 and a gap 714 there between. FIG. 7A also illustrates a cover 720 for covering the gap 714.

Figure 7B:
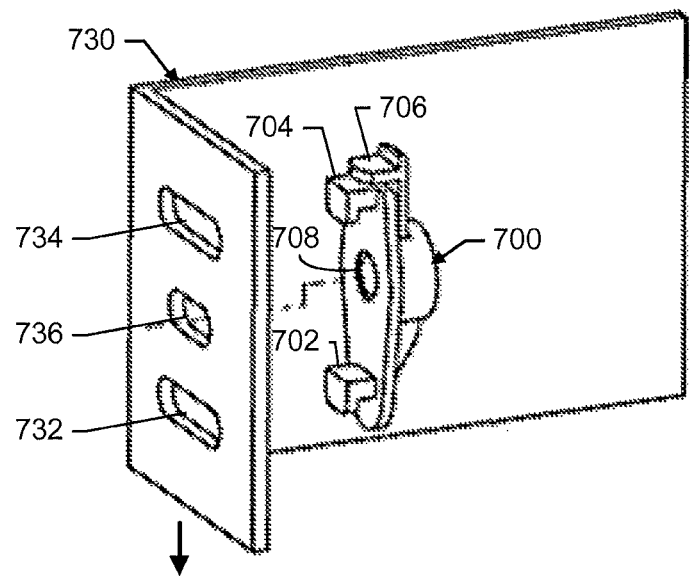
FIG. 7B is an illustration of the self-indexing nut plate and the bracket of FIG. 7A.
Figure 7C:
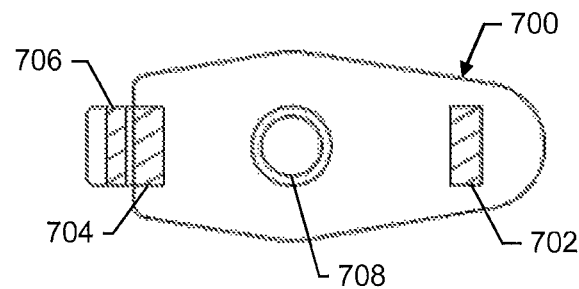
FIG. 7C is a cross-sectional view of the nut plate of FIG. 7B.

Additional reference is made to FIG. 7B. The sidewall gap cover 720 is mounted to a bracket 730 having a custom slot pattern consisting of first and second rectangular slots 732 and 734, and an opening (e.g., a hole or parallel slot) 736 in between. A nut plate 700 includes first and second posts 702 and 704 having rectangular cross-sections (FIG. 7C). The nut plate 700 may be attached to the bracket 730 by inserting the posts 702 and 704 into the rectangular slots 732 and 734 and moving the nut plate 700 in the direction of the arrow. A locking member 706 is then inserted in the space between the second post 734 and the trailing land. In this locked position, the nut plate's bore 708 is aligned with the opening 736 in the mounting bracket 730. After the nut plate 700 has been locked to the mounting bracket 730, a conventional threaded fastener 740 or ring post may be threaded onto the nut plate 700.

A nut plate herein is not limited to ring posts and other wire support hardware, nor is it limited to threaded fasteners. For example, a nut plate herein may be used with push-in fasteners.

Figure 8:
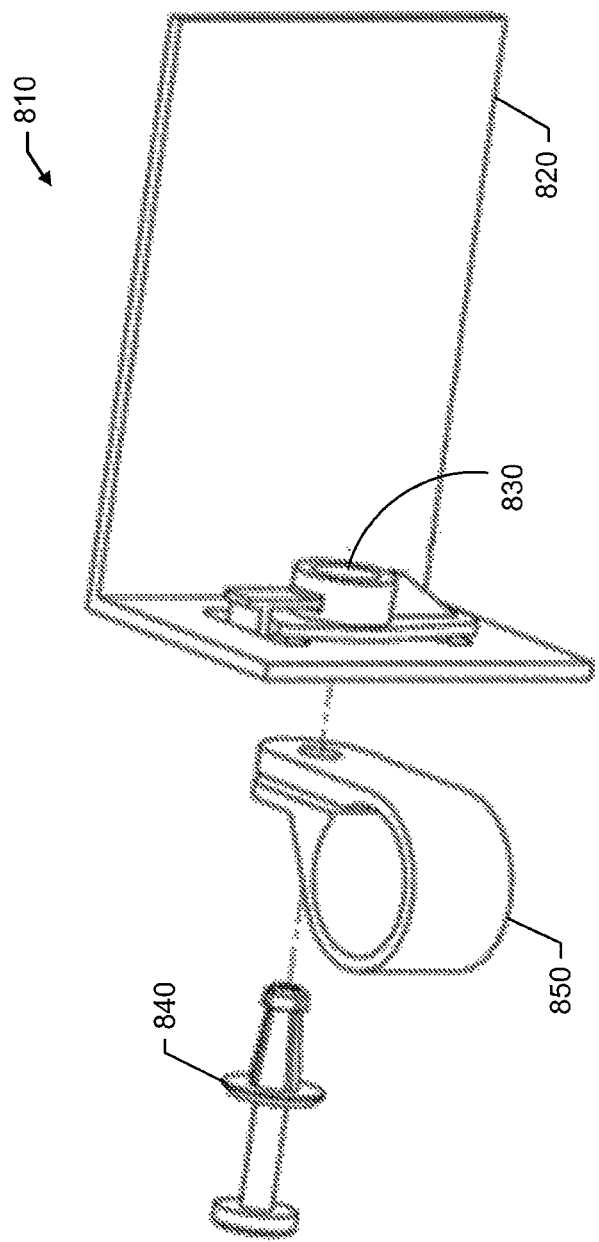
FIG. 8 is an illustration of an assembly including a bracket, a self-indexing nut plate, and a push-in fastener.

Reference is made to FIG. 8, which illustrates an assembly 810 including a bracket 820, a self-indexing nut plate 830, and a push-in fastener 840. The bracket 820 may have a slotted hole pattern for mounting the nut plate 830. The push-in fastener 840 may be used, for example, to fasten a p-clamp 850 to the bracket 820.

The invention claimed is:

1. An aircraft comprising:
    a plurality of spanner bars, each spanner bar having a pattern of mounting holes separated by lands; and
    a plurality of nut plates engaging the spanner bars, each nut plate including:
        a body;
        a mounting surface affixed to the body, the mounting surface being disposed against at least one of the spanner bars; and
        a first mounting post extending from the mounting surface and having a first undercut portion that abuts one of the lands;
        a second mounting post extending from the mounting surface and having a second undercut portion that abuts one of the lands; and
        a generally L-shaped spring lever comprising a first end cantilevered from the body; a second, free end; a retractable locking member extending generally downwardly from the free end of the spring lever and movable through a gap between a locked position and an unlocked position; and a release grip ledge adjacent to and extending generally transversely with respect to the locking member,
    wherein the first and second mounting posts are configured to extend into corresponding mounting holes in at least one of the plurality of spanner bars; and
    wherein the locking member is configured to occupy at least a portion of the same hole as the second mounting post to prevent the nut plate from disengaging at least one of the spanner bar bars when the spring lever is in a locked position.

2. The aircraft of claim 1, further comprising a plurality of wire bundles mounted to the nut plates.

3. The aircraft of claim 1, further comprising tubing mounted to the nut plates.

4. The aircraft of claim 1, wherein the body further includes an internal bore having an internally threaded portion, the posts located on opposite sides of the bore.

5. The aircraft of claim 4, wherein, the bore is offset from the posts by a distance such that the bore is aligned with an opening in the member when the nut plate engages its corresponding spanner bar.

6. The aircraft of claim 1, wherein the portion of the posts abutting against the lands are solid and elliptical in cross section.

7. The aircraft of claim 1, wherein each post terminates in an enlarged resilient cap, the cap and the mounting surface forming the undercut portion, which is wider than the spanner bar's gauge, the cap capturing an inner surface of the hole in the spanner bar as the nut plate is pushed into engagement, and wherein the locking member of the L-shaped spring lever makes an audible noise as it snaps onto one of the holes as the nut plate is pushed into engagement with the spanner bar.

* * * * *